Figure 1:
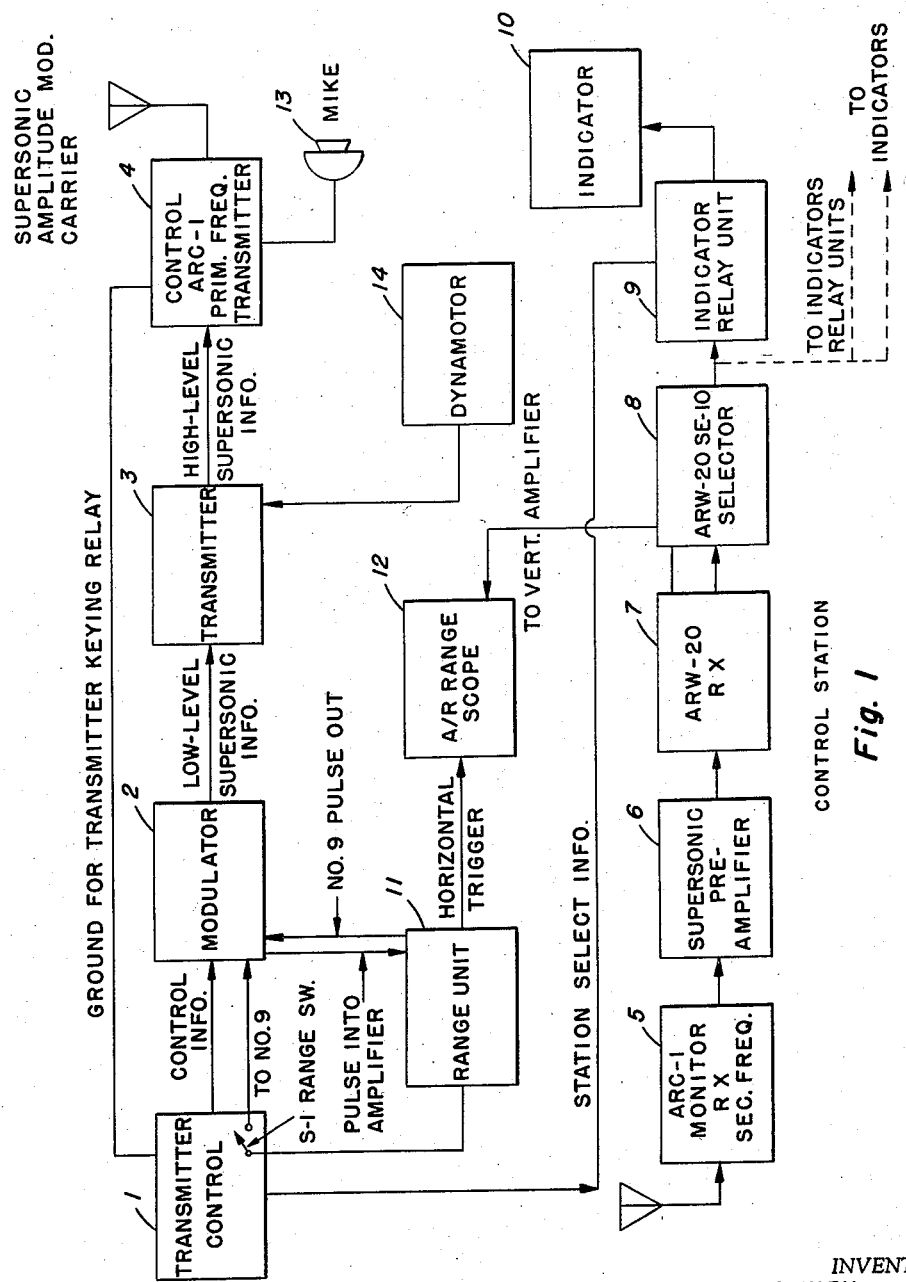

May 5, 1959  C. L. DOWNEY ET AL  2,885,667
DISPLAY TYPE COMMUNICATIONS SYSTEM
Filed July 6, 1955  17 Sheets-Sheet 1

INVENTORS
CURTIS LYNN DOWNEY
FRANCIS HOWARD CHARTREY
CLYDE WALTER GROW
HUGO STANLEY FERGUSON
BY
ATTORNEYS

TRANSMITTER CONTROL

TRANSMITTER CONTROL

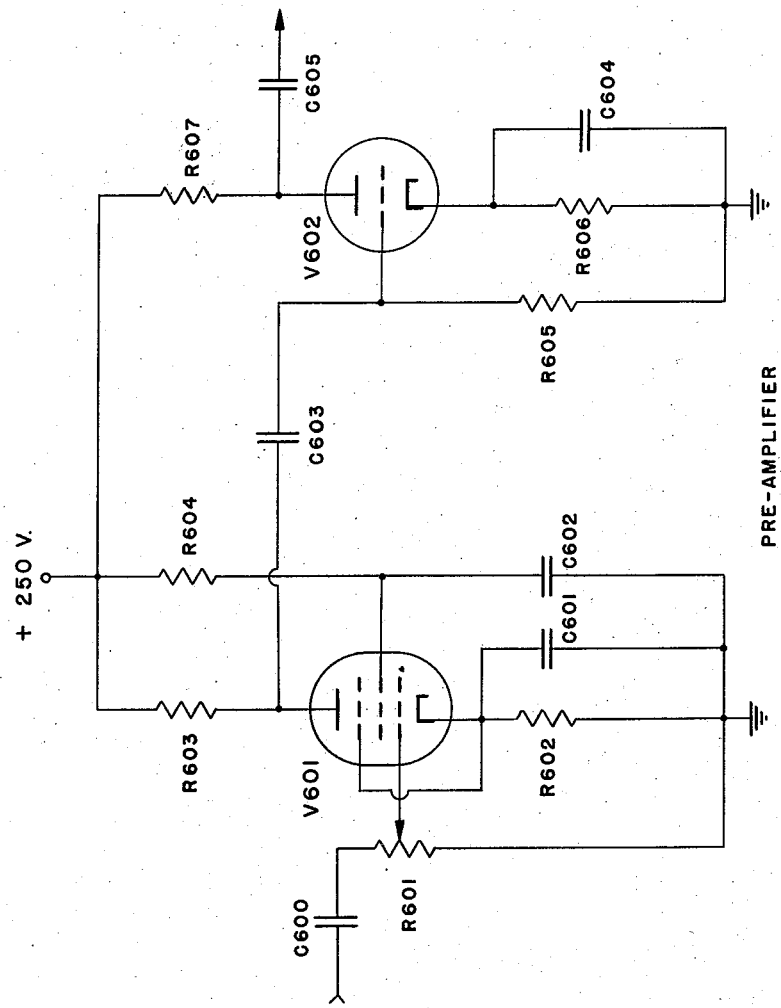
Fig. 6 PRE-AMPLIFIER

INDICATOR

INDICATOR RELAY UNIT

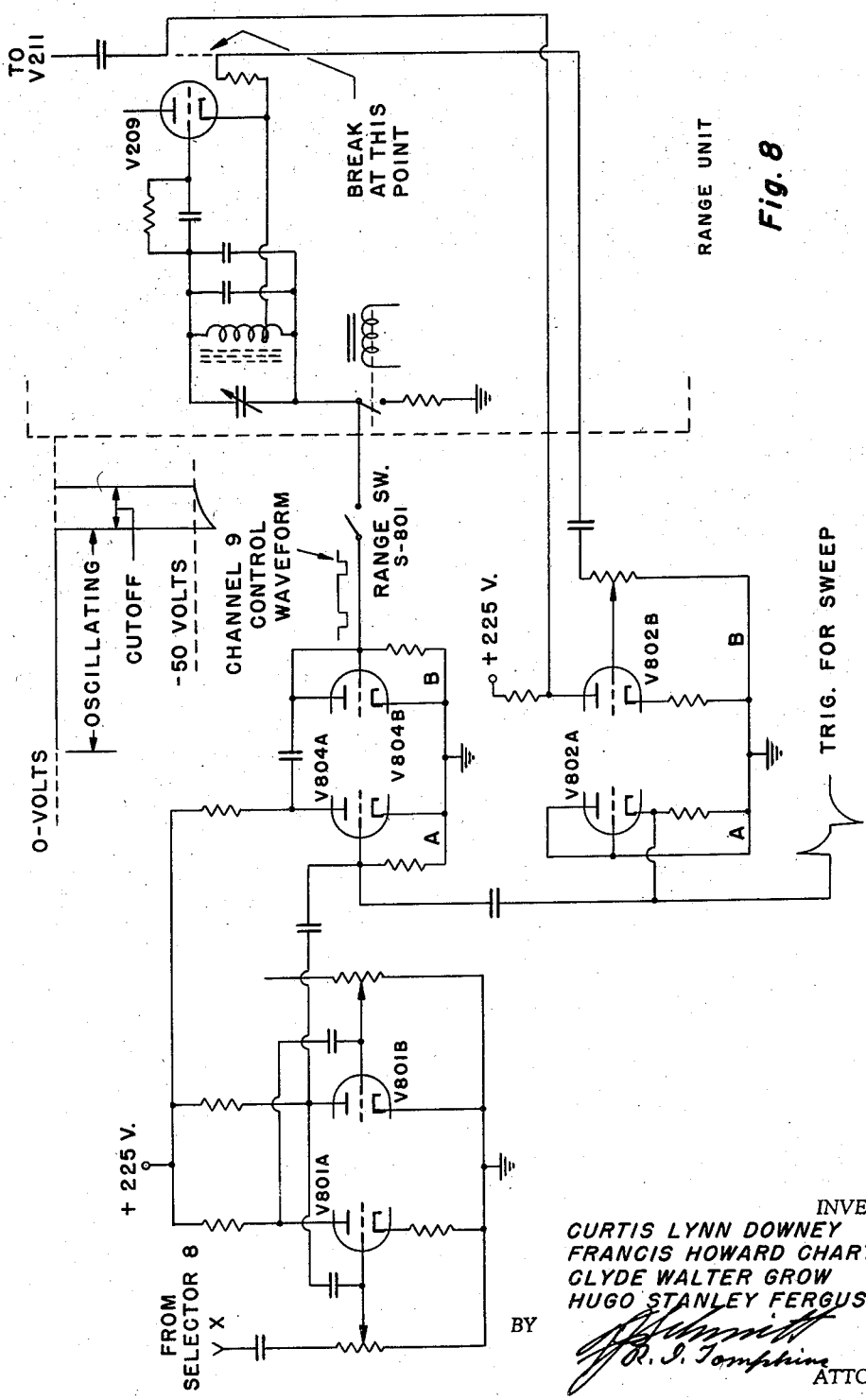

May 5, 1959  C. L. DOWNEY ET AL  2,885,667
DISPLAY TYPE COMMUNICATIONS SYSTEM
Filed July 6, 1955  17 Sheets-Sheet 11

INVENTORS
CURTIS L. DOWNEY
FRANCIS H. CHARTREY
CLYDE W. GROW
HUGO S. FERGUSON
BY
ATTORNEYS

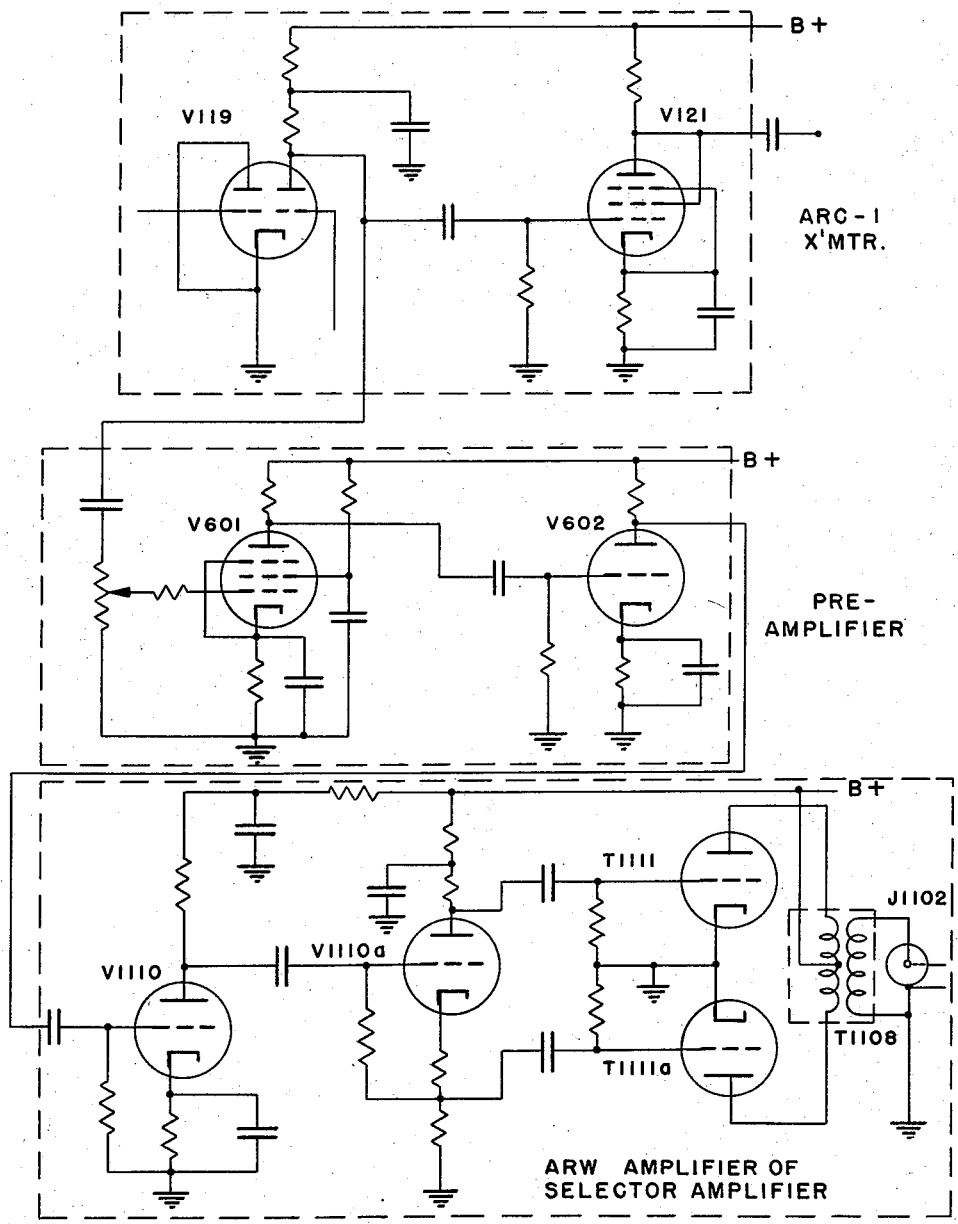
Fig. IIa

May 5, 1959   C. L. DOWNEY ET AL   2,885,667
DISPLAY TYPE COMMUNICATIONS SYSTEM

Filed July 6, 1955   17 Sheets-Sheet 13

SELECTOR ARW-20

INVENTORS
CURTIS LYNN DOWNEY
FRANCIS HOWARD CHARTREY
CLYDE WALTER GROW
HUGO STANLEY FERGUSON
BY
ATTORNEYS

SELECTOR ARW-20

May 5, 1959 — C. L. DOWNEY ET AL — 2,885,667
DISPLAY TYPE COMMUNICATIONS SYSTEM
Filed July 6, 1955 — 17 Sheets-Sheet 15
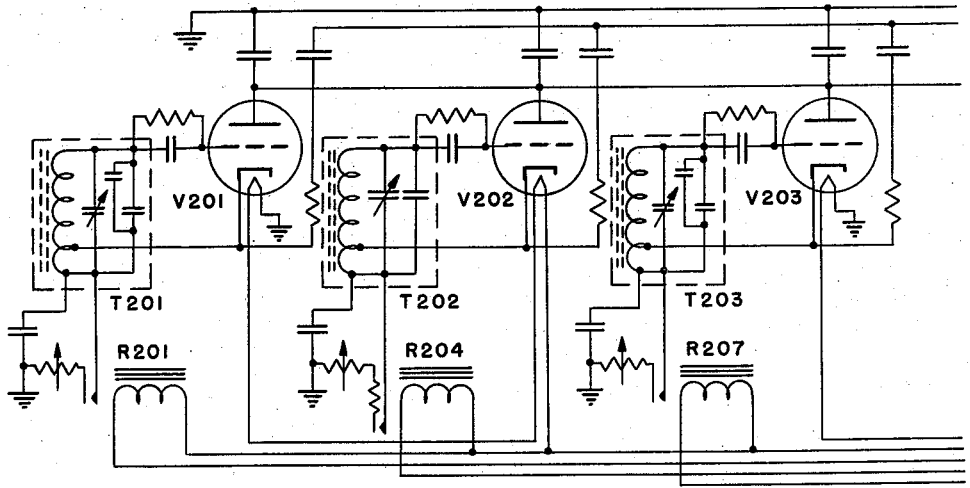
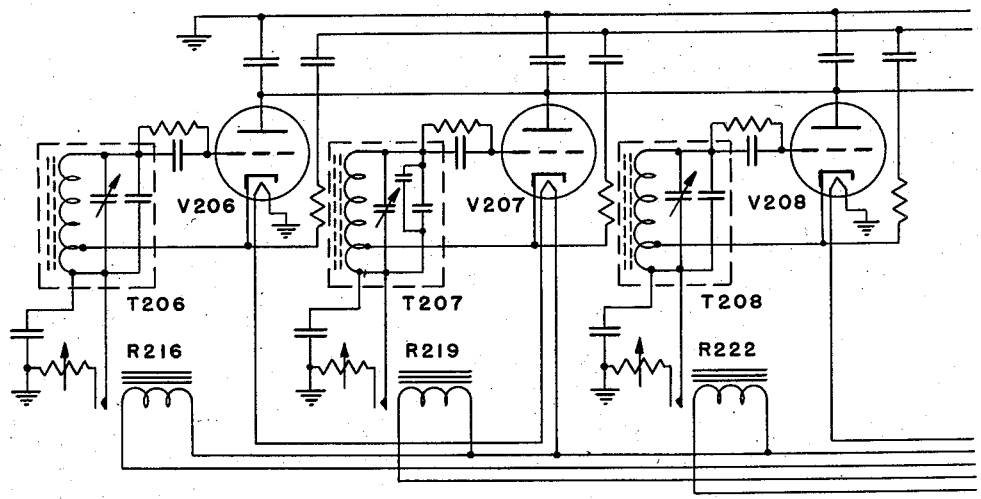
AMPLIFIER MODULATOR ARW-19
*Fig. 12a*
INVENTORS
CURTIS LYNN DOWNEY
FRANCIS HOWARD CHARTREY
CLYDE WALTER GROW
HUGO STANLEY FERGUSON
BY
ATTORNEYS

AMPLIFIER MODULATOR ARW-19

INVENTORS
CURTIS LYNN DOWNEY
FRANCIS HOWARD CHARTREY
CLYDE WALTER GROW
HUGO STANLEY FERGUSON

2,885,667

DISPLAY TYPE COMMUNICATIONS SYSTEM

Curtis L. Downey, Traverse City, Mich., Francis H. Chartrey, Cornelius, Oreg., Hugo S. Ferguson, Fairfax, Vt., and Clyde W. Grow, Del Mar, Calif.

Application July 6, 1955, Serial No. 520,384

5 Claims. (Cl. 343—7.6)

(Granted under Title 35, U.S. Code (1952), sec. 266)

The invention described herein may be manufactured and used by or for the Government of the United States of America for governmental purposes without the payment of any royalties thereon or therefor.

The present invention relates to a display type of communication system and more particularly relates to a system for communication from a vehicle to a plurality of other vehicles which will be particularly adaptable for use in combat to conduct airborne combat information, for application in carrier control approaches where the carrier is required to maintain positive secure and rapid control of many carrier-type aircraft, for application in aircraft control wherein it is required to maintain positive control of many aircraft, for application in ship to ship combat communication and which will be suitable for drone aircraft and guided missile utility. The inventive system provides for selection of any one of or a plurality of equipped stations in such manner that any of the stations selected can receive transmitted information. It also provides for uses wherein transmission of information may be displayed on a visual indicator and at the will of the originator may remain displayed while communications are transmitted to other selected stations until the displays are deliberately removed by the originator.

Systems of automatic communications of visual data have been devised before, for example, as that shown in Patent No. 2,475,848 to H. E. May, issued July 12, 1949, for a System for Automatic Transmission of Messages Between Flight Progress Boards and Aircraft, however, the inventive system is the first to provide a visual display type communication system suitable for transmission of information from a first station to a predetermined number of or a single preselected other station and wherein visual indication of the transmitted message is made available at the secondary station and transmitted to the primary station, and providing for such features as ranging, execution and acknowledgment and which is suitable for guidance applications.

Accordingly a purpose of the invention is to provide an apparatus wherein reliability, speed, range and security in the conduct of combat and other communications may be effected.

Another purpose of the instant invention is to provide for improved flexibility in the employment of standard airborne communication systems.

Another aim of the invention is to provide a system suitable for use in combat or in commercial aircraft control applications wherein airborne communication information is required to maintain positive secure and rapid control of any one of or a plurality of investigator, fighter and other type aircraft.

Still another aim of the present invention is to provide a system for application in carrier control approaches, in airport control approaches, in ship to ship communication systems, in multistation control of drone aircraft, guided missiles, or drone vehicles of other nature, and wherein a single aircraft or station is required to maintain positive, secure and rapid control of many other vehicles or stations.

Another object of the invention is to provide apparatus wherein selection of any one of a large plurality of (for example, one hundred) equipped stations (airborne, seaborne or land type) may be effected in such manner that only the station selected receives transmitted information.

Another object of the invention is to provide apparatus capable of transmission of information to a pre-selected station in such manner that the information is displayed on a visual indicator, and which at the will of the originator, may remain displayed while communications are transmitted to other selected stations, or until the display is deliberately removed by the originator.

Still another aim of the invention is to provide for automatic retransmission, by a selected station in such manner that a communication may be inspected for accuracy at the originating source before execute and/or acknowledge commands are ordered.

Still another aim of the invention is to provide for display of a plurality of communications, simultaneously, in such manner that any communication may be changed independently of other communications that are displayed.

Another object of the invention is to provide for visual display communication apparatus wherein determination of range of any selected station from the originating source may be secured.

Still another object of the invention is to provide a system suitable for use with any ultra-high-frequency, very-high-frequency, high-frequency, medium-frequency, or low-frequency communication equipment employing separate transmitters and receivers.

Another object of the invention is to provide a visual display communication system suitable for use with any frequencies communication equipments wherein transceivers may be employed by the sending and receiving stations.

Another object of the invention is to provide visual display communication apparatus wherein are included provisions for determination of bearing of a selected station from an originating source when used in conjunction with communications equipment operating on frequencies for which directional antennae are usable.

Another object of the invention is to provide for apparatus capable of simultaneous use of voice and display communications.

Another object of the invention is to provide for visual display, communications apparatus wherein control of many aircraft by a single aircraft or control of many vehicles by a single vehicle (as, for example, in a police communication system between motor vehicles), may be effected, and which will permit transmission to any one or any plurality of such control vehicles simultaneously when predetermined codes are determined.

Another aim of the invention is to provide apparatus for control of preselected vehicles from a control vehicle wherein the use of voice and display communications can be used simultaneously on the same frequency, using the same transmitters and receivers.

Another purpose of the invention is to provide apparatus usable with a special relay annunciator which annunciator is simple in design and rugged in construction and which will readily and accurately provide for counting of pulses in the display mechanism in step by step operation and which will contain inherent safety features to insure that display has been effected.

Another object of the inventive apparatus is to provide for a two-way communications system suitable for visual display and simultaneous voice communication at the same frequency and wherein multi-station control may be effected and which will be particularly subject to miniaturization, for multistation operation, and which will be capable of simultaneously or in correct sequence transmitting a plurality of intelligence signals, which apparatus will be rugged in construction, simple in design, easy to maintain, and which will be of light weight as to be readily adaptable to airborne or other communications systems wherein weight and size are important factors.

Figure 2:
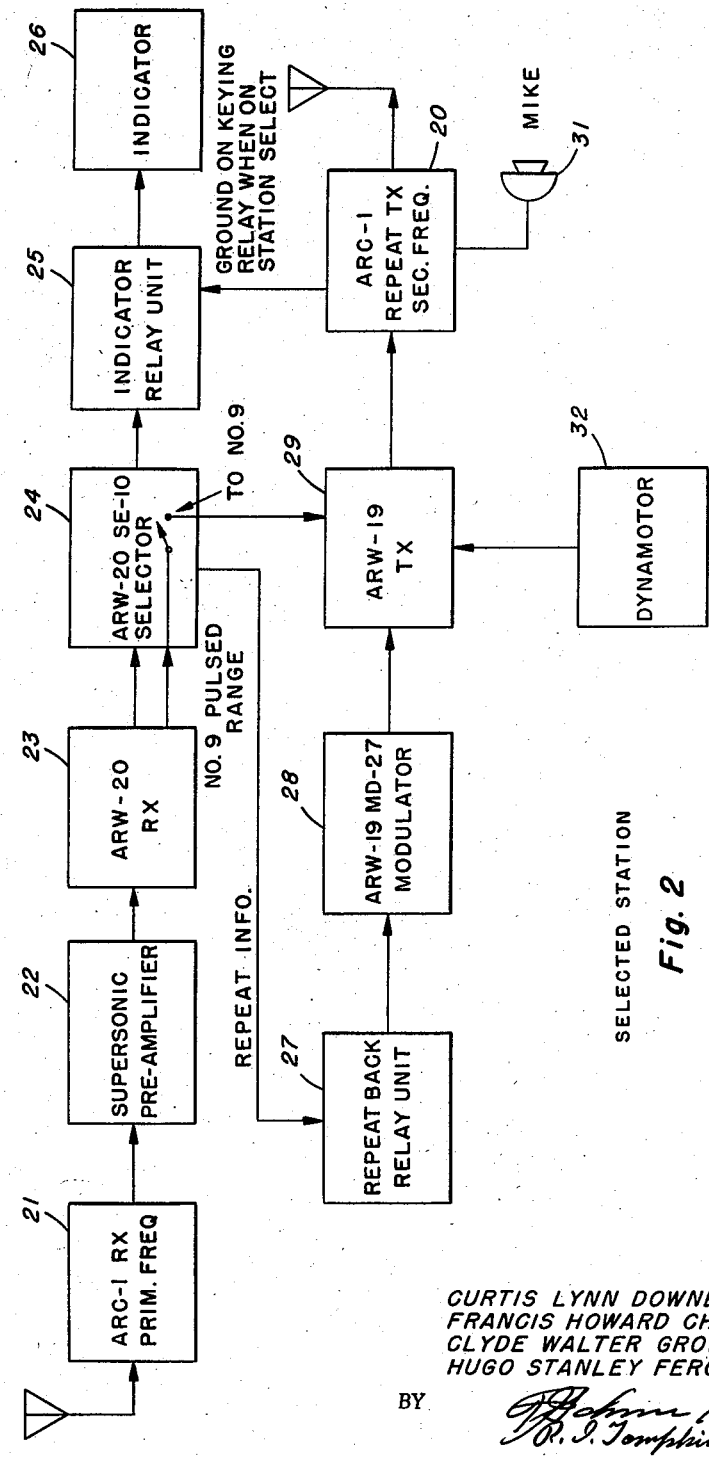
Figure 3:
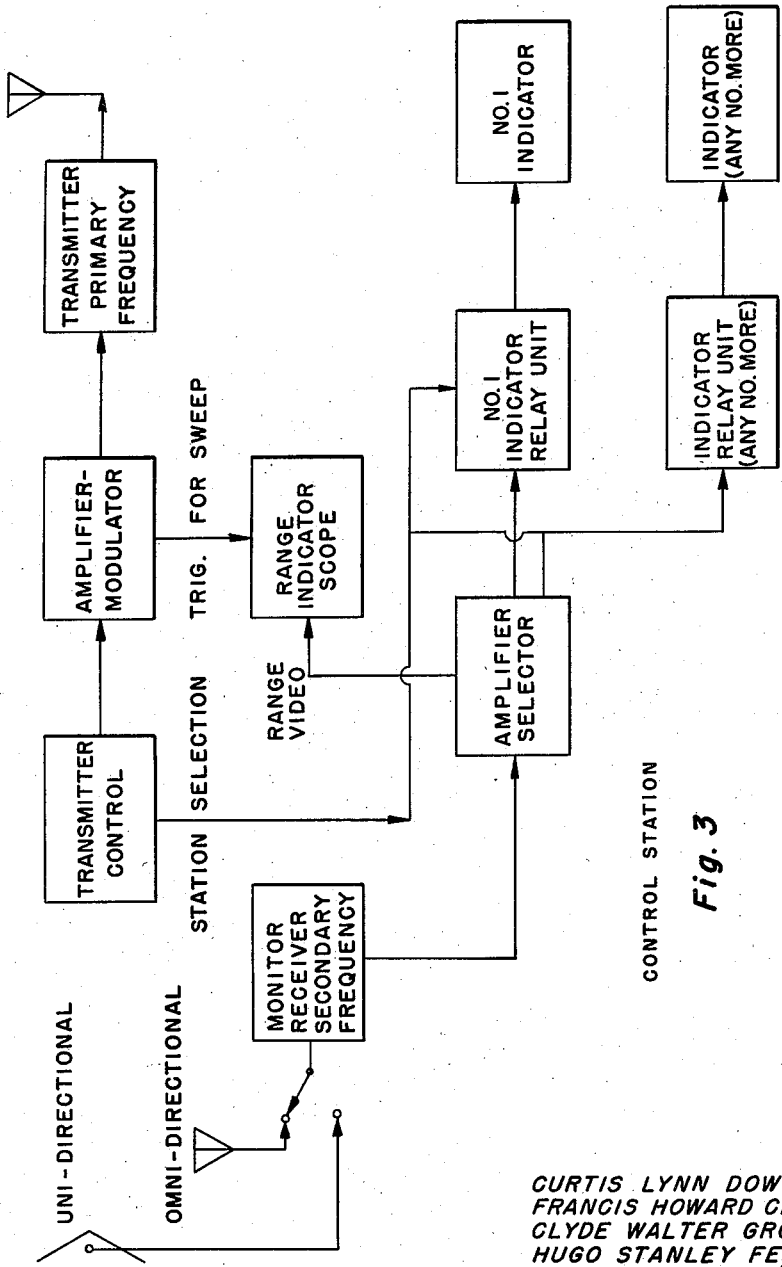
Figure 4:
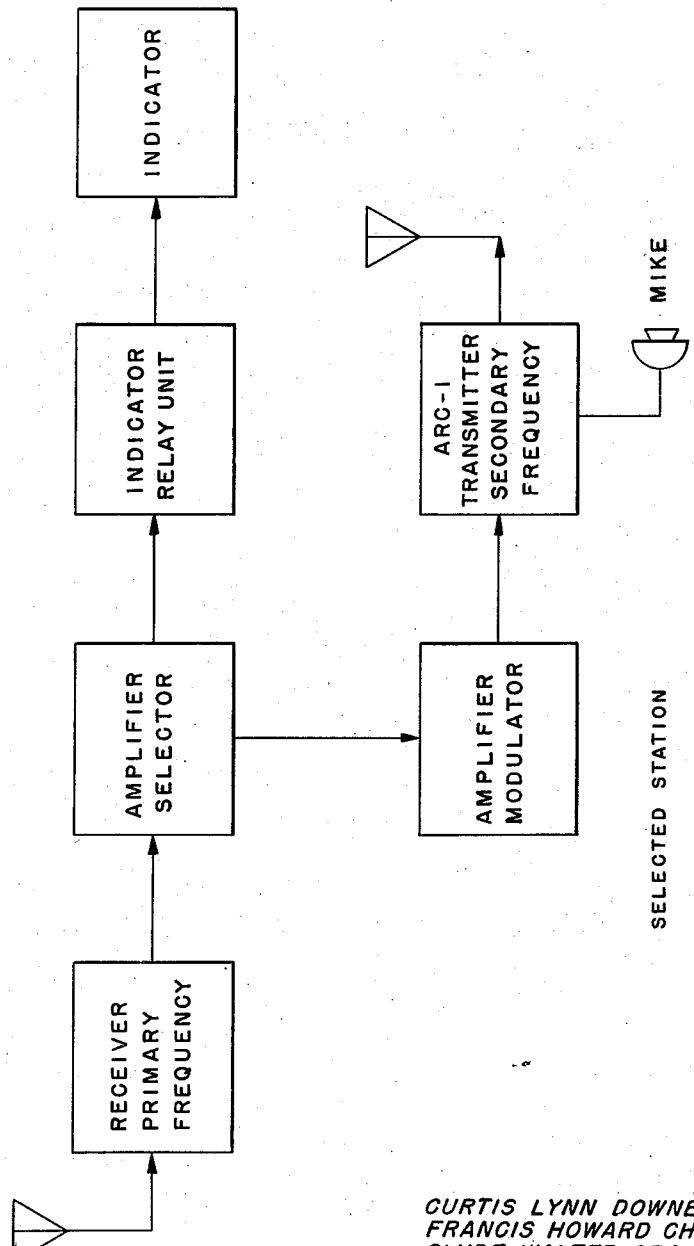
Figure 5A:
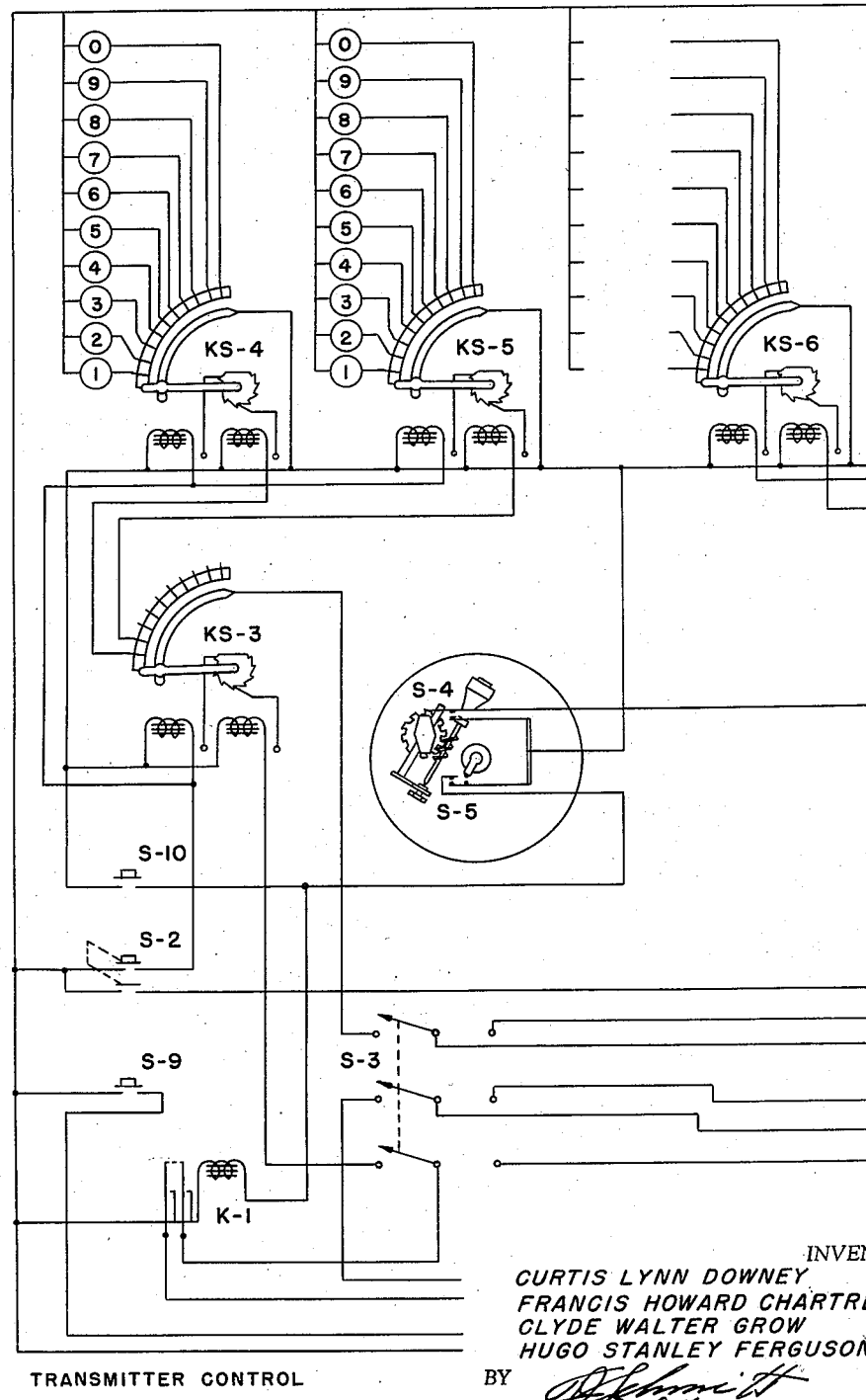
Figure 5B:
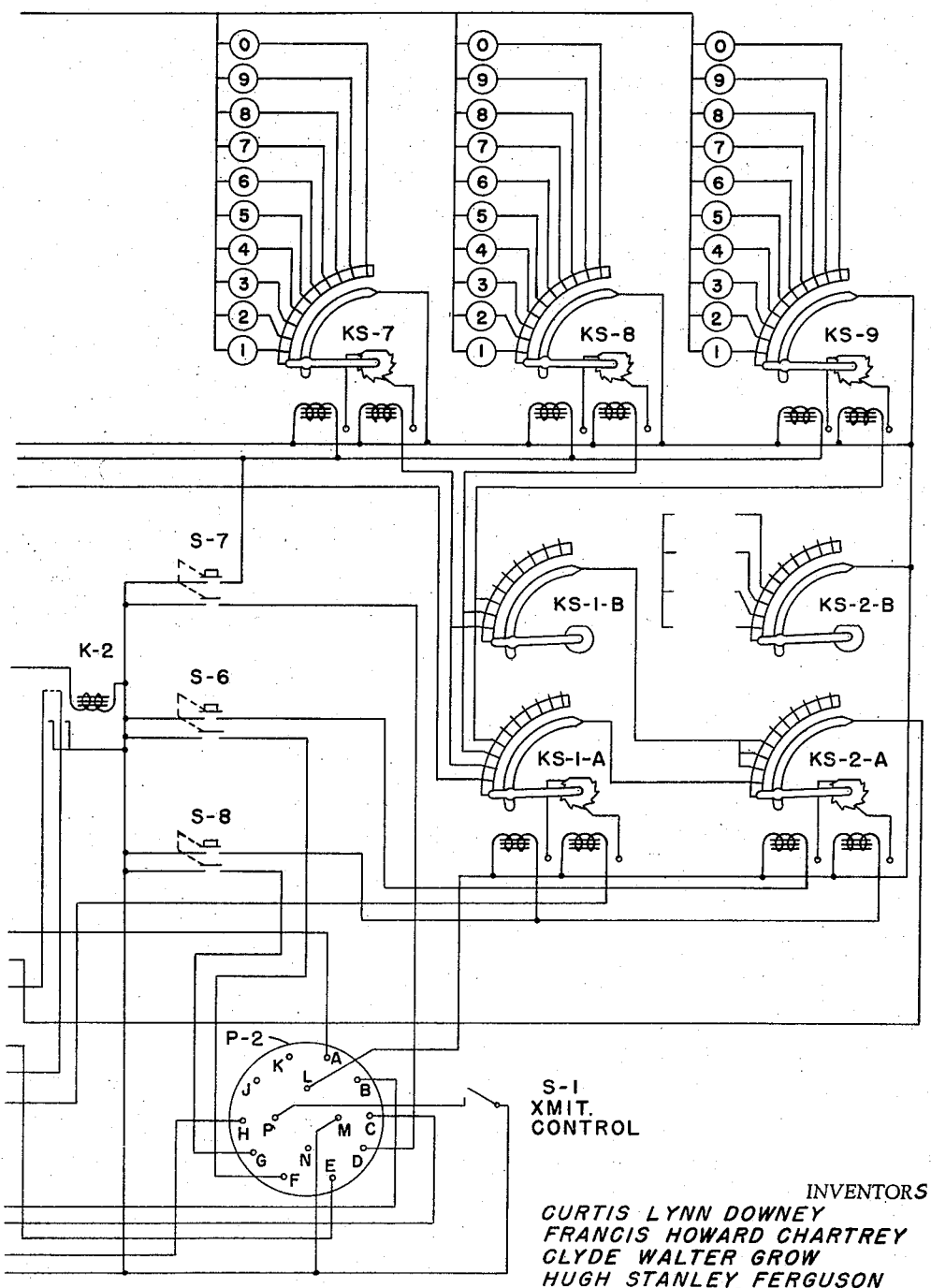
Figure 7A:
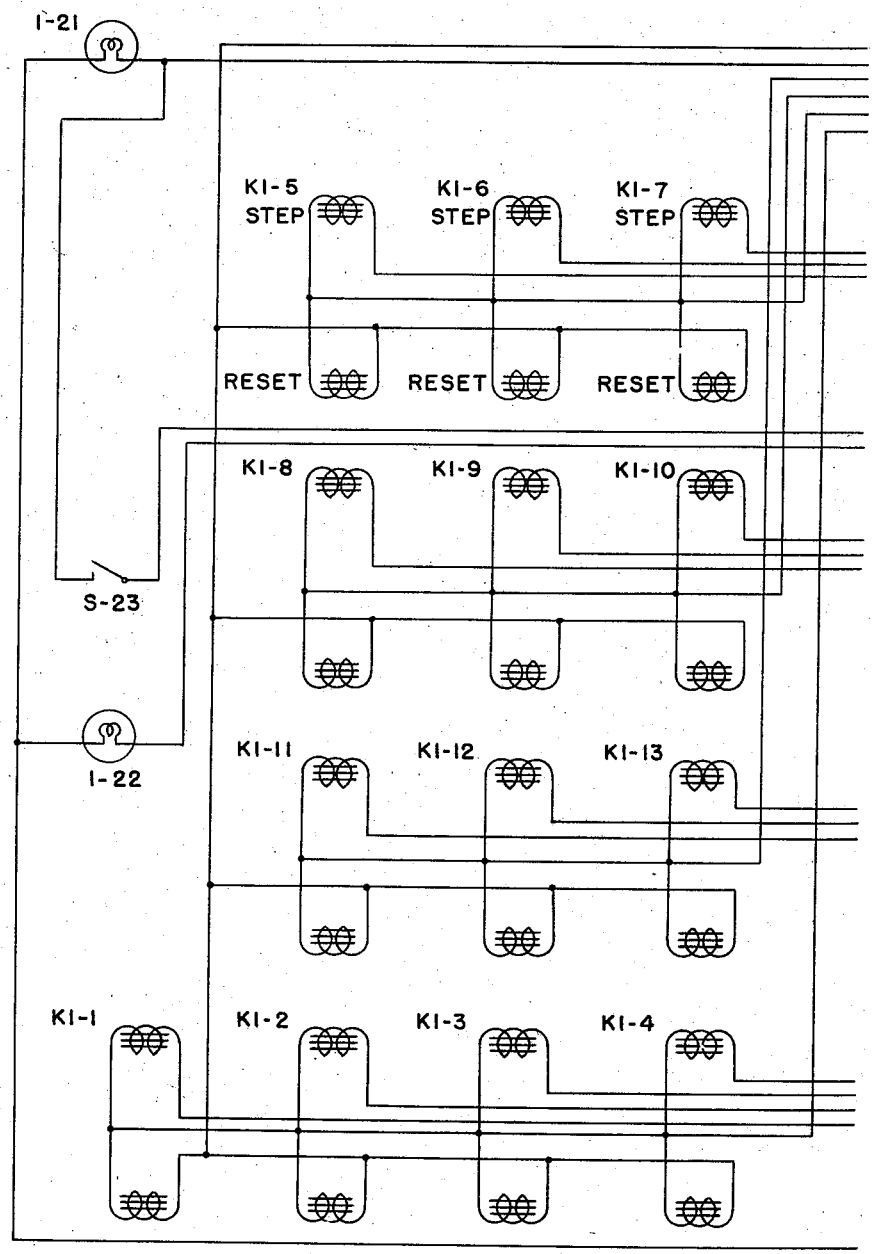
Figure 7B:
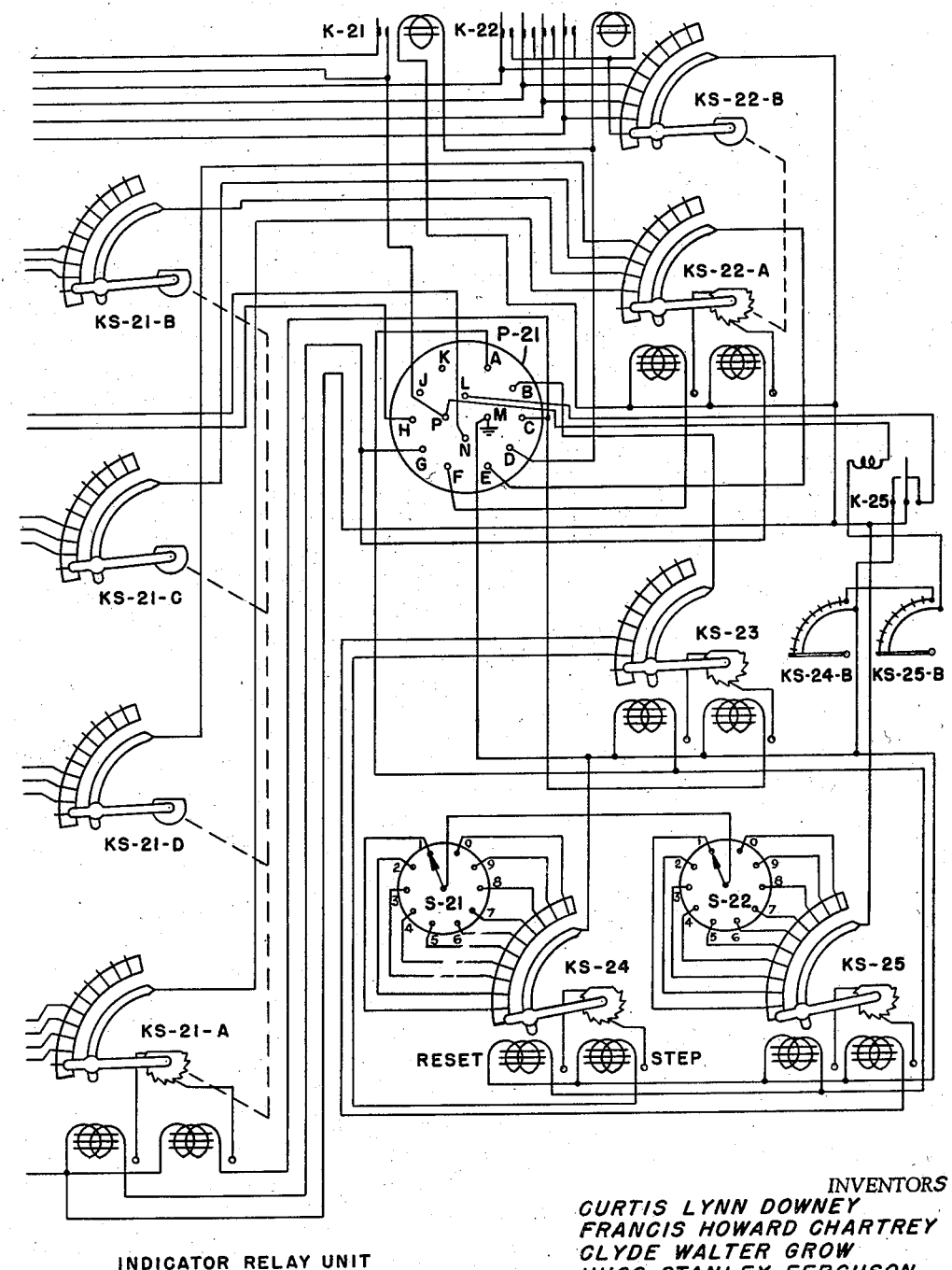
Figure 10:
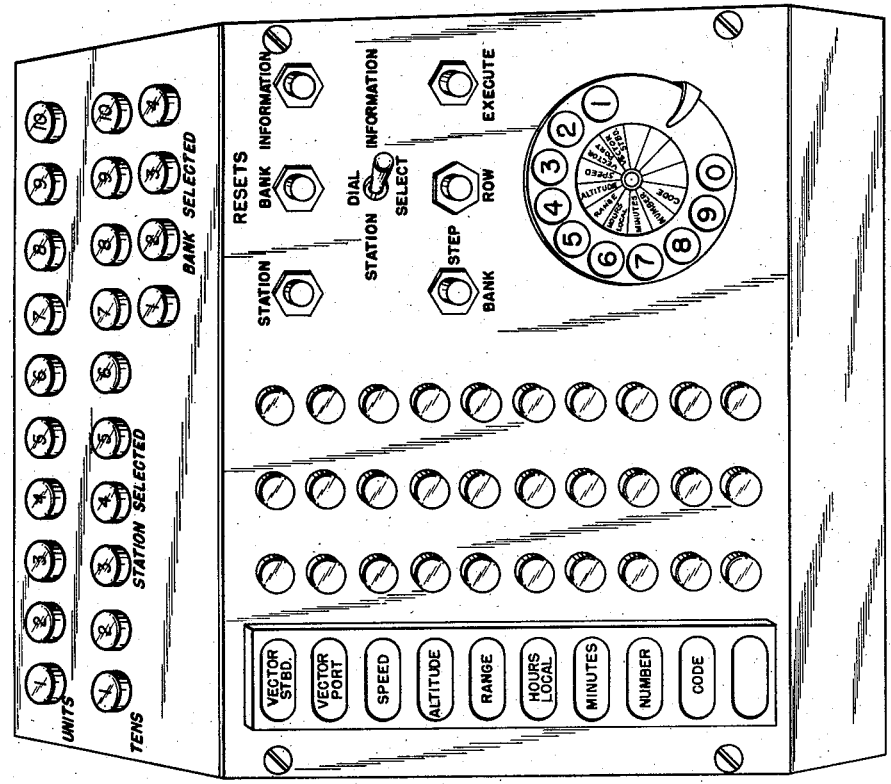
Figure 9:
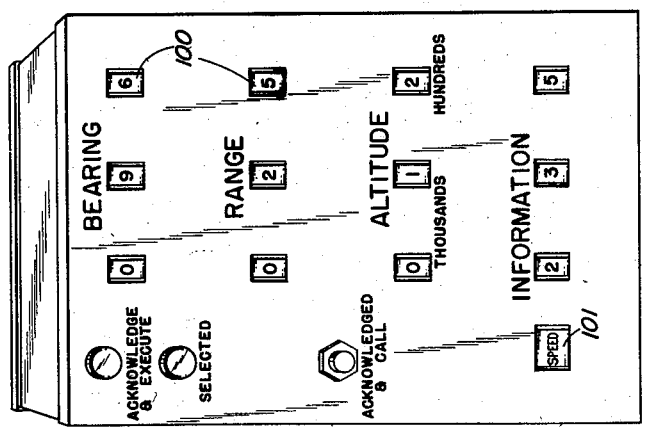
Figure 11B:
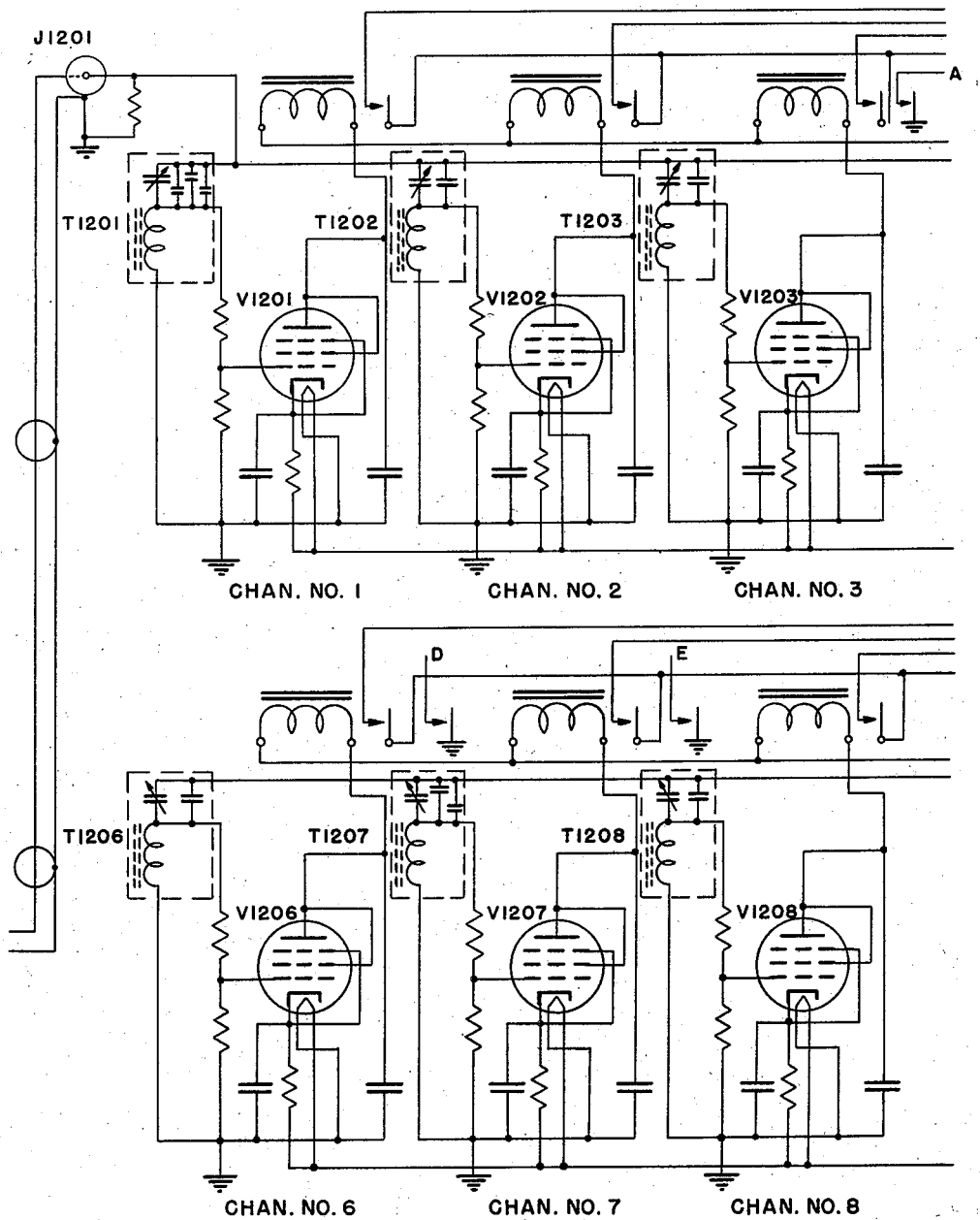
Figure 11C:
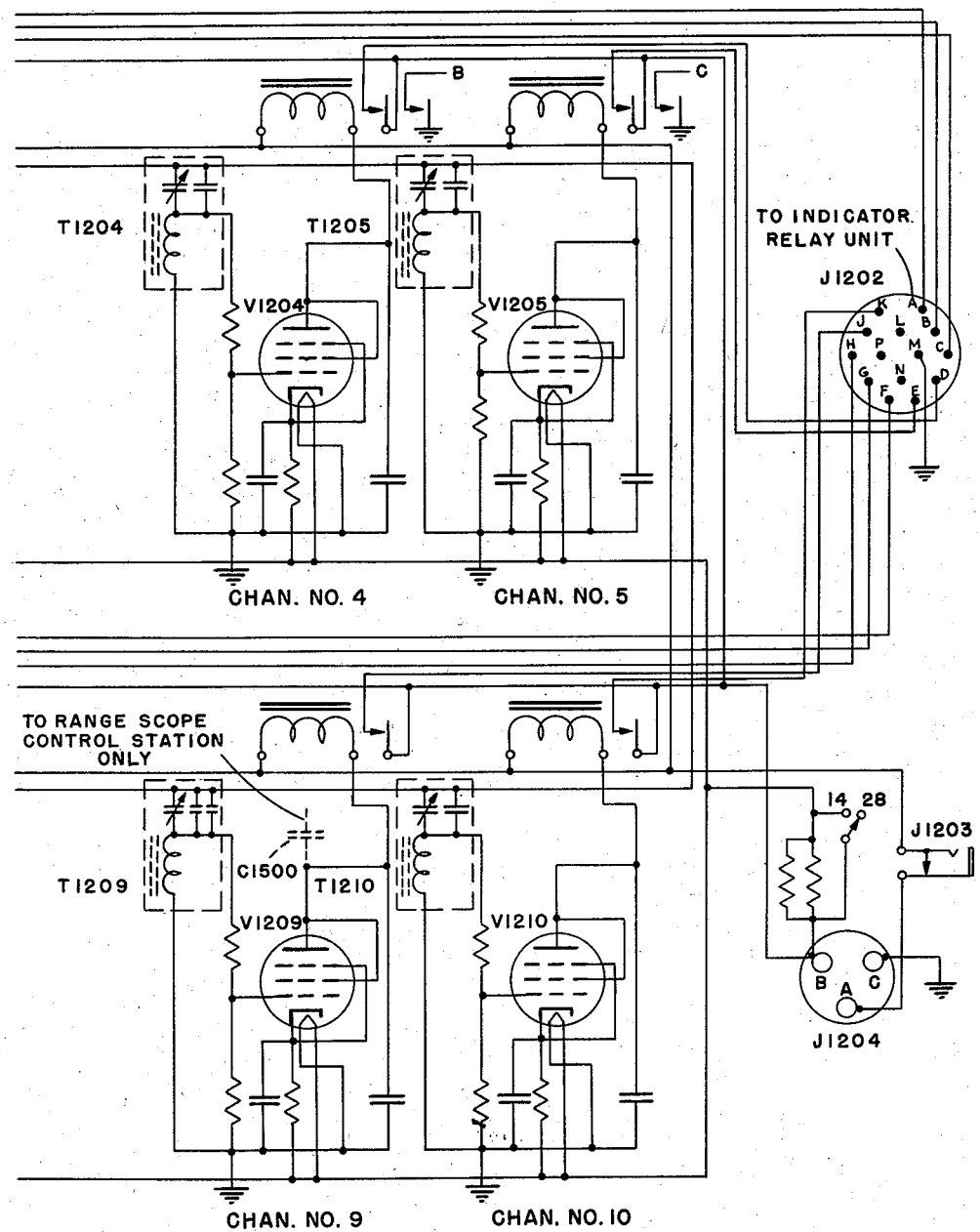
Figure 12B:
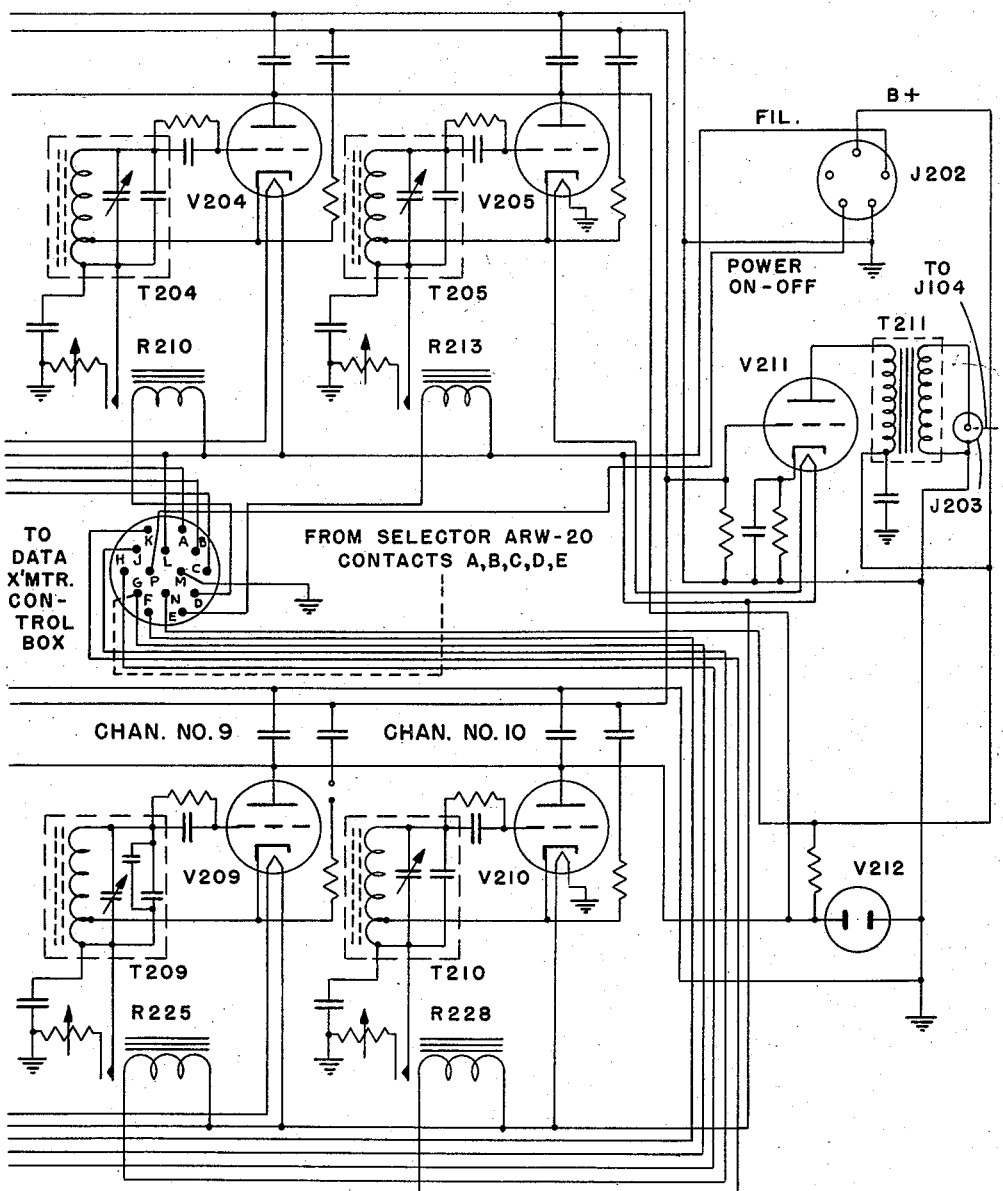
Figure 12C:
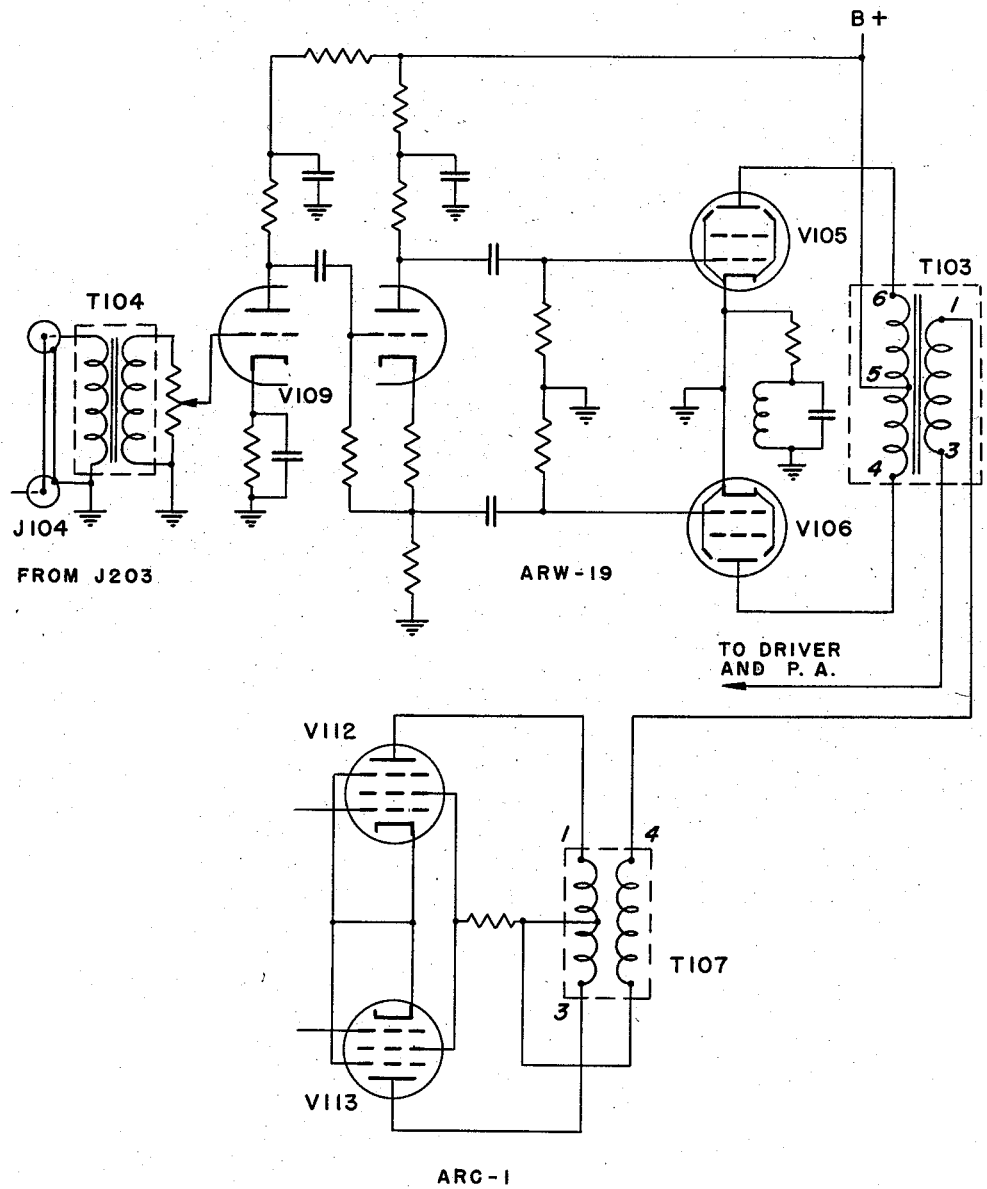

Other objects and many of the attendant advantages of this invention will be readily appreciated as the same becomes better understood by reference to the following detailed description when considered in connection with the accompanying drawings wherein:

Fig. 1 is a block diagram of the control station apparatus of an illustrative embodiment of the apparatus of the present invention, Fig. 2 is a block diagram showing the selected station apparatus of the illustrative embodiment of the invention, Fig. 3 is a simplified block representation of a modified version of the control station apparatus of Fig. 1, Fig. 4 is a block diagram of a modified version of the selected station apparatus of Fig. 2, Figs. 5a and 5b are to be taken together in side by side relationship and represent a schematic diagram of the transmitter control system of the embodiment shown of the instant invention, Fig. 6 is a schematic representation of the preamplifier circuit of the embodiment shown of the present invention, Figs. 7a and 7b are to be taken together in side by side relationship and show a schematic representation of the indicator and relay box unit of the embodiment shown of the present invention, Fig. 8 is a schematic representation of the range unit designed for the illustrative embodiment of the instant invention and showing tie-in with the ARW-19 known apparatus to be described later, Fig. 9 is a pictorial isometric representation of the indicator unit of the illustrative embodiment of the instant invention, Fig. 10 is a pictorial isometric representation of the transmitter control unit of the illustrative embodiment of the instant invention, Figs. 11a, 11b and 11c are to be taken in side by side relationship wherein Fig. 11a is a schematic representation of signal receiving apparatus of the invention showing tie in of units of the ARC-1 monitor, the preamplifier of Fig. 6 and units of the amplifier of the AN/ARW-20 receiver, Figs. 11b and 11c are schematic representations of units of the selector of the AN/ARW-20 receiver utilized in the inventive device, and Figs. 12a, 12b and 12c are to be taken in side by side relationship wherein Figs. 12a and 12b present a schematic representation of the MD-27 modulator of the AN/ARW-19 transmitter and Fig. 12c presents a schematic representation of transmitter units of the AN/ARW-19 transmitter following the modulator in the illustrative embodiment of the invention shown in Figs. 1 and 2.

In one application of the illustrative embodiment of the inventive apparatus the system may provide for control of as many as one hundred aircraft on individual station selection basis so that information such as azimuth, bearing, proper elevation, and range of a target from a controlled aircraft may be effectively transmitted from a control aircraft to a selected aircraft and provisions are provided for repeat back of information to insure that correct transmittal of information from the control aircraft to the selected aircraft has taken place. Referring briefly to Fig. 10 of the drawings, it may readily be seen that information may be transmitted by dialing on a telephone type dial system. This information will be received at the panelling shown in Fig. 9 of the drawings at the selected station and a repeat back system will show the operator in the control aircraft on a similar unit that correct information has been transmitted and received by the selected station.

Referring now to the drawings and more particularly to Fig. 1 the control aircraft system may have a unit for transmitting operation in which a transmitter control unit 1 (to be described in detail later) may present control information to a modulator 2. A conventional modulator may be utilized such as described in the Navy Department Handbook of Maintenance on Instructions for Radio Transmitting Sets AN/ARW-19, AN/ARW-19X, AN/ARW-21, AN/ARW-21X and Radio Receiving Sets AN/ARW-20, AN/ARW-20X, AN/ARW-22, AN/ARW-22X—AN16-30ARW19-3, published under authority of the Secretary of the Air Force and the Chief of the Bureau of Aeronautics, approved December 1, 1948. The equipment described therein will be hereinafter referred to as ARW-19 and ARW-20 as applicable. This modulator as adapted, tied in and used herein is shown in Figs. 12a and 12b of this application. The modulator 2, upon being actuated by transmitter control information will feed information further at a low-level supersonic frequency to a transmitter unit 3. Transmitter unit 3 may be a conventional tone-modulated transmitter unit such as that shown in the ARW-19 transmitter unit as referred to hereinbefore and shown in Fig. 12c of this application. The supersonic control channels of the modulator 2 (ten channels, from 20 kcs. to 120 kcs.) of an AN/ARW-19 modulator (if used), transmit signals to the transmitter 3, and if the ARW-19 transmitter is used the RF (radio frequency) section of the transmitter will not be used (see Fig. 12c). The secondary of the modulation transformer in transmitter 3 is placed in series with the audio modulation transformer (usable frequencies, at 80% modulation approximately 150 c.p.s. to 3000 c.p.s.) of a transmitter 4 which may be operated on primary frequency. This provides for simultaneous keying of supersonic channels for display communications and keying of microphone 13 for voice communications. Transmitter 4 may be of the type known as ARC-1 to the Navy and described in Hand Book of Maintenance Instructions for Model AN/ARC-1, Aircraft Radio Equipment, AN16-30 ARG-1-3, approved April 26, 1944, and reissued April 1, 1945. This transmitter is not shown schematically inasmuch as any number of conventional transmitters of the type could be used. Referring more particularly to Fig. 2 of the drawings the supersonic amplitude-modulated carrier signal is received in receiver 21 in the selected station. Receiver 21 operates in a conventional manner for reception of voice communications. This receiver may be of the type known to the Navy as ARC-1 and is described in the Hand Book of Maintenance Instructions for Model AN/ARC-1 referred to above.

The second detector (see Fig. 11a) of the ARC-1 receiver 21 may be connected to the input of the supersonic pre-amplifier 22, the output of which is connected to the three stage super-sonic amplifier 23. The ARW-20 receiver referred to above may be used for this unit, except that the RF (radio frequency) section of the ARW-20 receiver 23 is not used and its detector is disconnected from the super-sonic circuits. The output of the amplifier 23 which may be the ARW-20 three stage amplifier referred to above is connected to the input of the selector 24. The ARW-20 selector may be used for this purpose (see Figs. 11b and 11c). The outputs of the various channels of the selector 24 such as the ARW-20 selector are connected to the inputs of the indicator relay unit 25. The outputs of the indicator relay unit 25 operate the indicator 26 (best shown in Fig. 7a), thus providing visually displayed communications. Indicator relay unit 25 is best shown in Fig. 7b and will be described in detail hereinafter.

As shown in Fig. 2, the outputs of the selector 24, the ARW-20 selector, are also connected to the inputs of the repeatback relay unit 27. The repeat back relay unit 27 consists of a plurality of relays (the coils of which are shown in Fig. 7a) which are respectively energized to close on receiving a signal from the respective channels of selector 24 upon a signal being introduced into that channel and on closing operate the modulator 28 to cause a signal output from transmitter 20. The outputs of the repeatback relay unit 27 are connected to the inputs of the repeatback modulator 28. The ARW-19 repeatback modulator may be used for this purpose. As each super-sonic channel of the selector 24 is actuated to supply communications to the indicator 26, the appropriate relay in the repeatback relay unit 27 closes and keys the corresponding super-sonic channel of the repeatback modulator 28 (see Figs. 12a and 12b). The output of the super-sonic channels of the repeatback modulator 28 are amplified in the output of the transmitter 29. The amplifiers of the type used in the ARW-19 (see Fig. 12c), are suitable for this unit. The transmitter output is applied to the carrier of the repeatback transmitter 20 on Secondary frequency in the same manner as hereinbefore described. The ARC-1 transmitter may be used as unit 20. The transmitter 20 is tuned to a secondary (different) carrier wave frequency to prevent reintroduction of the repeatback information into receiver 21. As each super-sonic pulse is received at the selected station, the corresponding supersonic channel of the repeatback transmitting system is automatically pulsed so that the communication is returned to the originating source at the secondary frequency. Only the selected station will have the carrier of its repeatback transmitter in operation.

As shown in Fig. 1, the monitor receiver 5 (which may be an ARC-1 monitor tuned to the secondary frequency) receives communications automatically returned to it by the repeatback transmitting system of the selected station. In the same manner as hereinbefore described, these communications are transferred through the supersonic preamplifier 6, the receiver 7, the selector 8 and the indicator relay unit 9 to the monitor indicator 10. The Navy's ARW-20 receiver and selector may be used for units 7 and 8. The indicator relay unit 9 and indicator 10 are duplicates of the units used in the selected station, shown in Figs. 7a and 7b.

The output of the monitor receiver 5 is fed to the same number of indicator relay units 9 and monitor indicators 10 as there are selected stations under continuous display communications control. Specifically, if fifteen (15) selected stations are employed in a mission, fifteen (15) indicator relays units and fifteen indicators are required. This arrangement is necessary if it is desired that the control station maintain a simultaneous monitor of all displays in all selected stations employed. Where it is desired to monitor a display only as it is transmitted and retention is not required, only one indicator relay unit and one indicator are necessary for monitor display. By way of correlation of the figures, and with particular reference to Figs. 1 and 2 of the drawings, transmitter control 1 is illustrated pictorially in Fig. 10 and schematically in Figs. 5a and 5b. Modulator 2 is shown schematically in Figs. 12a and 12b. Transmitter 3 is shown schematically in Figure 12c which also shows the input stages of transmitter 4. Dynamotor 14 is a part of transmitter 3.

Referring to Fig. 2 the detector and audio output stages of receiver 21 are shown schematically in Fig. 11a. Fig. 11a also shows the tie-in of receiver 21 to a schematic representation of supersonic preamplifier 22.

Preamplifier 22 (Fig. 2) and preamplifier 6 (Fig. 1) are identical and each comprise a conventional 2 stage RC coupled supersonic preamplifier (best shown in Fig. 6). Referring to Fig. 6, the preamplifiers each comprise 2 stages of amplification V-601 and V-602 to amplify the incoming signal. This preamplifier is incorporated into the circuit as shown in Fig. 11a between the ARC-1, receiver 5 and the ARW-20 selector amplifier 7 (if used) at the control station and between the ARC-1 receiver 27 and the ARW-20 receiver 29 (if used) at the selected station.

The receiver amplifier 23 and selector 24 are shown schematically in Figs. 11a (bottom), 11b and 11c. Indicator relay unit 5 is shown schematically in Figs. 7a and 7b and the indicator is shown pictorially in Fig. 9. The repeatback relay unit 7 is illustrated schematically in Figs. 11b and 11c at A, B, C, D, and E at the top portion of those figures. Modulator 28 is schematically represented in Figs. 12a and 12b and transmitter 29 and a portion of repeatback transmitter 20 is shown schematically in Fig. 12c. It should be understood that transmitter 20 while a substantially identical unit to transmitter 4 is tuned to a secondary frequency. Dynamotor 32 is incorporated in the unit of transmitter 29.

Referring again to Fig. 1 of the drawings, a portion of receiver 5, supersonic preamplifier 6 and the receiver amplifier 7 are shown schematically in Fig. 11a, Fig. 6 being the preamplifier specifically designed for the use in the invention. Selector 8 is shown schematically in Figs. 11b and 11c. Indicator relay unit 9 is schematically shown in Figs. 7a and 7b.

Inasmuch as ARW and ARC-1 transmitter and receiver units are known apparatus described in the handbooks referred to hereinbefore, and details of these circuits do not form a part of the instant invention, the schematic representations being shown for the purpose of expressly pointing out the tie in of these forms of apparatus to present one illustrative embodiment of the inventive device, no detailed description of these units is given herein. However, wherever possible handbook part numbering of these units has been followed in the drawings for purposes of clarification and simplification of the teachings. Modulators 2 and 28, transmitters 3 and 29, transmitters 4 and 10 (save for particular frequency tuned for), receivers 5 and 21 (save for particular frequency tuned for), supersonic preamplifiers 6 and 22, receivers 7 and 23, selectors 8 and 24 (save for ranging circuits coupled in), indicator relay units 9 and 25, indicators 10 and 26 are pairs of units each unit of a pair being a physical unit which may be identical to the other of the pair and therefore only one figure has been used in the drawings to illustrate a unit of the pair. In view of the possibility of a great many known transceivers or transmitters and receivers being readily applicable portions only of the ARC-1 receiver and transmitter have been shown in the schematic representations to illustrate input and output connections to these units.

Referring more particularly to Figs. 3 and 4 proposed systems for control and selected stations respectively are shown. These systems may have specially designed units to replace the units of Figs. 1 and 2 which adapted existing equipment to make the illustrative embodiment. Amplifier-modulator 41 would have additional channels, means for sufficient modulation power to modulate the most high powered airborne communication transmitter may be incorporated and the selectors may be provided with dual-contact channel-output relays to permit deletion of the repeatback relay unit. A directional antenna (see Fig. 3) may be provided for use with the Secondary frequency chosen for repeatback with switching to select the directional or the omni-directional antenna to allow for bearing information.

Ranging

When the range switch S1 on the transmitter control unit 1 is closed, a pulse oscillator (variable from 150 c.p.s. to 450 c.p.s.) in the ranging unit 11 (shown in Fig. 8) initiates a trace on the horizontal sweep of the A/R range scope 12 and simultaneously pulses supersonic channel number nine (102.5 kcs. for example) in the modulator 2. The A/R range scope may be of the type commercially known as the Dumont type 256-B A/R range oscilloscope. The output of channel number nine is fed back to and amplified in the ranging unit 11 and the output of the ranging unit amplifier is fed to the amplifier of modulator 2. From this point, the amplified 102.5 kcs. pulse is fed through the control transmitting system on Primary frequency in the same manner as described above. At the selected station (Fig. 2) the 102.5 kcs. pulses are received by receiver 21 and are coupled through supersonic pre-amplifier 22 and receiver 23 and key channel number nine in the selector 24. When channel number nine in the selector 24 closes, it directly couples the 102.5 kcs. pulses from the output of the receiver 23 to the input of the transmitter 29. The 102.5 kcs. pulses are amplified in transmitter 29 and applied to the carrier of the repeatback transmitter 20 on Secondary frequency. The ranging circuits in the selected station receive the original range pulses on Primary frequency, amplify them, and directly couple them to the carrier of the repeatback transmitter 20 on Secondary frequency. The range pulses are received by receiver 5 and coupled through supersonic amplifier 6, receiver-amplifier 7 and selector 8 to the vertical amplifier of A/R range scope 12. The pulses are displayed on range scope 12 in a conventional manner.

Referring to Fig. 8, wherein ranging unit 11 is shown in detail along with channel 9 of amplifier modulator ARW-19, tube V-801, which may be a 12SN7 type, is used in a circuit designed to operate as a conventional variable frequency unbalanced free-running multivibrator. This multivibrator V-801 may be variable in frequency from one-hundred-fifty (150) cycles-per-second (c.p.s.) to four-hundred-fifty (450) cycles-per-second (c.p.s.). The output of the multivibrator V-801 is fed to a short-time-constant resistance capacity (RC) network (V-802A and associated components). The RC network produces both a positive and a negative pulse output. The positive pulse is applied to the input of the sweep amplifier in the horizontal sweep circuits of the A/R range scope 12, thus controlling the sweep frequency (trace recurrence rate) of the horizontal trace (negative pulses being removed by the clipping action of V-802A).

The output of multivibrator V-801 is also fed to a squaring amplifier (V804A and associated components) whose output is coupled to a D.C.-restorer (V804B and associated components). The D.C.-restorer V804B places the longer portion of the square-wave at ground potential (electrical ground). The long interval during which the square wave is at ground potential is the interval during which channel number nine (102.6 kcs.) in the modulator 2 is permitted to oscillate and to modulate the carrier of the control transmitter 4 on Primary frequency. The remaining interval of the square wave (the short negative portion) biases the 102.5 kcs. oscillator to cut-off for a short period. This arrangement pulses the 102.5 kcs. channel at a rate determined by adjustment of the multivibrator V-801. When running at one-hundred-fifty cycles-per-second (150 c.p.s.) experiments show a ratio of positive portion to negative portion of the square wave in the order of nine to one produces best results.

The long 102.5 kcs. pulses act at the selected station to keep channel number nine relay in the selector 24 closed which directly couples the pulses received on Primary frequency to the carrier of the repeatback transmitter 20 on Secondary frequency. This returns the range pulses to the control station where they are displayed on the A/R range scope 12. In the control station, channel 9 of selector 8 is utilized. The range pulses are coupled through C1500 of selector 8 (see Fig. 11c) to range scope 12.

Pulsing at a one-hundred-fifty cycles-per-second (150 s.p.s) rate provides for ranging to at least five hundred (500) nautical miles. If this pulse rate is reduced to twenty-five cycles-per-second it will provide for ranging to at least three thousand (3000) nautical miles.

*Operation*

With all components of the control transmitting system (Fig. 1) turned on and operating normally, station selection is accomplished in the following manner:

Close "Transmitter Carrier" switch (S-1, Figs. 1 and 5b) that may be located on the transmitter control unit 1. Closing this switch operates the keying relay (not shown) in transmitter 4 and places the carrier in continuous operation.

Press the "Station Reset" switch (S-2, Fig. 5a). This causes the transmitter carrier to be modulated by the output of super-sonic channel number one of modulator 2. Receipt of super-sonic channel number one is common in all receiving stations equipped with this system and operating on the assigned Primary carrier frequency. It should be understood that in the discussion below when a super-sonic channel is keyed, the modulation of the carrier in the transmitter at the control station will take place and the modulated carrier will be received at the selected or controlled station and the corresponding modulation channel at the selected station will effect the particular function there. For the sake of brevity, however, description will be made of keying, etc. to effect the function with the above process being understood in each case.

Receipt of channel number one in the selected stations introduces energy in pin A of connector P-21 (Fig. 7b) and energizes the reset solenoids of KS-24 and KS-25 ("station selection" switches, Fig. 7b) and energizes the reset solenoid of KS-23 ("station row select" switch), causing all station selection switches to relax to neutral (no contact) position.

The "station selection-information" switch (S-3, Fig. 5a) is placed in the "station selection" (left) position. This places the telephone dial "pulser" S-4 in control of super-sonic channel number two (through pin B of connector P-2).

Initial movement of the dial (see Fig. 10) closes switch S-5, Fig. 5a, which keys supersonic channel number three and keys it continuously until the dial relaxes to neutral. This continuous keying of channel number three (one continuous pulse) steps the "row select" relay KS-3 in the transmitter control unit 1 to position #1 and steps the "row select" relays KS-23, Fig. 7a, in the indicator relay units to position #1 in all stations equipped with this system operating on Primary frequency. Relaxing movement of the dial causes the dial "pulser" S-4 to modulate the carrier with super-sonic channel number two a number of times corresponding to the number dialed. This pulsing of channel number two occurs simultaneously with the continuous keying of channel number three that was initiated by first movement of the dial. Prior to complete dial relaxation keying of channels two and three ceases. The channel two pulses keyed by the dial are fed through contact #1 in all "station row select" switches causing the "tens stepping" switches KS-4, Fig. 5a, to step to the selected number.

Dialing of the second digit of the desired station selection number accomplishes a repetition of the sequence above, except that initial dial movement (one pulse of channel number three) steps all "station row select" switches to the next position (contact #2) which feeds the output of the dial "pulser" S-4 (channel number two) to the "units stepping" switches KS-5, Fig. 5a, and KS-25 in Fig. 7b. This completes station selection and illuminates a light (I-1) that is marked "selected" on the indicator panel. This warns the selected station of an expected message.

All stations will respond to the same station selection numbers but only that station which has its "manually-operated-station-selection-control-switches" (S-21 and S-22, Fig. 7b) set to the particular number that is dialed will have its indicator stepping and reset circuits (KI-1 through KI-13, Fig. 7a, KS-21, KS-22, K-21 and K-22, Fig. 7b) completed to ground through the "manually-operated-station-selection-control" switches S-21 and S-22 and through the "station selection" stepping switches KS-24 and KS-25.

When station selection is completed a ground is placed on the keying relay of the repeat back transmitter 20 (through pin L of connector P-21), placing it in operation on Secondary frequency. The carrier will remain in operation until station selection is changed.

In normal operating techniques each station is assigned an individual station selection number, therefore only one station will respond to communications transmitted after a particular station selection is dialed. An alternate arrangement is described below.

The inventive system provides for the setting of one-hundred (100) aircraft on individual station selection. Variations may be introduced through patch-cord paralleling of two or more station selection numbers in each aircraft in a section or division so that all aircraft containing this arrangement can be made to respond to one common group selection number in addition to responding to their individual station selection numbers. This arrangement can be further amplified to provide for automatic repeatback from only the group leader when the group is selected, or if operational conditions require security, patching may be made so that no aircraft in a selected group completes the loop to provide automatic repeatback. In its present configuration, dialing of "zero zero" ("00") with the station selection circuits provides for display of communications to all aircraft operating on the proper Primary frequency. As presently configured, none of the stations will complete the loop to provide automatic repeatback when "00" is dialed, but patch-cord paralleling may be used to provide repeatback from the scene of action commander.

Referring more particularly to Fig. 7b, when 00 is dialed, for station selection, stepping switches KS-24b and KS-25b are advanced to uppermost position completing the circuit to ground through K-25 which is connected to pin P which has 28 volts impressed thereon. Energizing of relay K-25 causes its contacts to shift removing the ground from pin L of connector P-21 thus placing the enabling ground on the system.

When it is desired to change from one station selection number to another, the foregoing sequences are repeated. For example, if the apparatus is to be used for aircraft display communication the following procedure would be utilized.

The normal sequence in which display communications may be transmitted is Information, Bearing, Range and Altitude (see Fig. 9).

Communications transmitted on the Information bank may be composed of two parts; "prefix" and three numerals.

"Prefix" may be either "Speed," "Hours," "Minutes," "Code," "Latitude," "Longitude," "Emergency" or any chosen ten (10) Key designator prefixes determined by operational requirements.

The prefix or designator may be followed by any combination of numbers between 000 and 999 that may be desired and dialed.

Bearing, Range and Altitude or other combination of designators may be used as permanent designators, and when one of the permanently designated banks is selected, any appropriate combination of three numerals may be dialed. It should be understood, however, that the invention is not to be restricted to a set number of banks or numerals.

Display type communications are transmitted in the following manner:

With the switch S-1 (Fig. 5b) marked "Xmit Control" still in the "on" (closed) position, and with station selection completed, "Station selection-Information" switch S-3 is placed in the "Information" (right) position. This places the dial "pulser" S-4 in control of supersonic channel number five.

"Bank Reset" (S-6, Fig. 5b) is pressed. This keys super-sonic channel number six which energizes the reset solenoid KS-2, Fig. 5b), and KS-22 Fig. 7b ("bank select" stepping switch), and relaxes it. In relaxed position of the "bank select" switch a ground is completed to the "multiple reset" relay (K-22, Fig. 7b) so that when "Information Reset" (S-7, Fig. 5b) is pressed, keying super-sonic channel number four, it closes "multiple reset" relay (K-22, Fig. 7b) and "information reset" relay (K-21, Fig. 7b). This energizes the reset solenoids (bottom as shown) of all Stepping Indicators and relaxes all Indicating Drums 100 (Fig. 9) of the relay annunciators KI-1 through KI-13, inclusive, to "Blank" position.

It should be understood that several commercial types of relay annunciators may be utilized for the indicating drum assemblies (KI-21—KI-33). In a practical embodiment of the invention the annunciator described in copending application for Relay Annunciator, application Serial No. 494,585, filed March 15, 1955, by Francis H. Chartrey, was utilized and is a particularly desirable form for the purposes of this invention although the repeat-back feature of that relay need not be used in the embodiment of Fig. 1 of the present invention since repeat-back is taken from the selector 24 (see Fig. 2).

"Bank Select" switch (S-8, Fig. 5b) is pressed one time. This keys a super-sonic channel number seven (in the control station modulator which causes the selected station modulator, really a demodulator), one time which energizes the stepping solenoid of the "Bank Select" stepping switch KS-22 and moves the stepper to position #1, completing all bank A circuits to ground through KS-22B, Fig. 7b. Bank A would comprise KI-1, 2, 3 and 4 adjacent KS-21A, bank B would comprise KI-5, 6, 7 shown adjacent KS-21B. This also transfers output of channel number five (dial, information) through KS-22A, Fig. 7b, to bank A of the "Data Row Select" stepping switch KS-21, Fig. 7a. Simultaneously, channel number seven energizes the reset solenoid of the "Data Row Select" stepping switch, KS-21 causing it to relax.

The operator's finger is placed in the telephone dial hole (see Fig. 10) adjacent to the desired "prefix" (as speed) and dial. Initial movement of the dial keys supersonic channel number three continuously until the dial relaxes by action on S-5, Fig. 5a. This continuous keying of channel number three (one continuous pulse) steps the Data Row Select switch (KS-1, Fig. 5b) in the transmitter control unit 1 to position #1 and the Data Row Select switches (KS-21, Fig. 7b) in the indicator relay unit 9 to position #1. Relaxing movement of the dial causes the dial "pulser" S-4 to modulate the carrier of the control transmitter 4 with super-sonic channel number five a number of times corresponding to the number adjacent to the "Prefix" that was dialed. This pulsing of channel number five occurs simultaneously with the continuous keying of channel number three that was initiated by first movement of the dial. Prior to complete dial relaxation keying of channels two and five ceases. The channel number five pulses are fed through contact #1 of bank A in the Data Row Select switch KS-21 of the selected station, causing the "Prefix Indicating Drum" 101 to step or rotate to the desired "prefix." As each of the three numerals following the prefix are dialed in succession, initial movement of the dial through single pulsing of channel number three progressively steps the Data Row Select switch KS-21 to the next succeeding position. Relaxation of the dial causes the Indicator Drum 100 to rotate to a position corresponding to and indicating the dialed number.

To transmit communications on the Bearing, Range and Altitude banks;

"Bank Select" S-8 is pressed one time. The three desired numerals are dialed and the Indicating Drums 100 under the permanent designator "Bearing" will rotate to the dialed numbers in the same manner as described above.

To transmit numerals to the "Range" designator, "Bank Select" S-8 is pressed one time and the desired numerals are dialed.

To transmit numerals to the "Altitude" designator, "Bank Select" S-8 is pressed one time and the desired numerals are dialed.

Normal bank sequence may be varied. Any selected bank may be omitted by pressing the "Bank Select" switch S-8 an additional time, which will step control to the next succeeding bank in the normal order. This operation may be repeated at any point in the bank order.

If an error is noted in any bank prior to pressing "Bank Select" S-8 for transfer to the next bank, the display on that particular bank may be removed by pressing the "Information Reset" switch S-7, Fig. 5b, which resets only that bank, and the desired communication may then be re-dialed.

If communications are displayed on all banks and it is desired to change or remove the display of any one bank, press "Bank Reset" S-6, Fig. 5b, and then press "Bank Select" S-8 the number of times necessary to step control to the desired bank. Press "Information Reset" S-7 to remove display and then dial new information, if desired.

To erase display from all banks press "Bank Reset" S-6 and "Information Reset" S-7. All indicator or annunciator relays 100 would then relax to the blank position.

*Ranging*

When the control-operator desires to obtain ranges from a selected station to the control station the "Range" switch located on the transmitter control unit is pressed.

When the "Range" switch S-801, Fig. 8, is pressed it places the Ranging Unit in control of the horizontal sweep of the A/R Range scope 12 and in control of supersonic channel number nine of the modulator 2.

When the information has been sent from the control station to the selected station and verified by the hereinbefore described repeatback procedure, an execute command may be initiated by pressing the execute switch S-9, Fig. 5a, which keys super-sonic channel number 8 causing an indicator light I-22 in the selected station indicator unit shown in Fig. 7a to light. Upon receipt of the execute signal, after observation of light I-22, the selected station may acknowledge by pressing switch S-23 which actuates channel 8 and keys the Secondary transmitter 20. The acknowledge signal is received in the control station repeatback system, units 5, 6, 7, 8, 9 and 10 and displayed by energizing indicator light I-22.

The acknowledgement system explained above can be used as a calling system from any of the controlled vehicle stations to the control station on a prearranged plan or code to request information as for example a request to bring the selected vehicle up to date on information.

It is also possible to utilize the equipment for determination of bearing of the selected station with respect to the control station and vice versa if a rotatable or displaceable directional antenna is used. The antenna would be directed until the observer at the A/R range oscilloscope observes maximum signal.

Obviously many modifications and variations of the present invention are possible in the light of the above teachings. It is therefore to be understood that within the scope of the appended claims the invention may be practiced otherwise than as specifically described.

What is claimed is:

1. A display type communications system including control station apparatus and selected station apparatus; said control station apparatus comprising a first channel type modulator, a transmitter control unit connected to actuate said modulator, a first transmitter amplifier connected to amplify the output of said modulator, a control transmitter connected to be modulated by the amplified output of said modulator, said control transmitter being operated on a primary frequency; said selected station apparatus comprising a receiver tuned to said primary frequency, a first preamplifier connected to amplify the output of said receiver, a first amplifier coupled to said preamplifier, a first channel selector connected to couple the output of the amplifier into a first predetermined channel, a first indicator relay unit comprising a first plurality of relays connected to be actuated by respective channels of said selector, and a first indicator connected to be operated by said relays to visually display communications; information repeatback means in said selected station comprising a repeatback relay unit including relays connected to respective outputs of said first channel selector, a repeatback modulator connected to be actuated by said repeatback relays, a second transmitter amplifier connected to amplify the output of said repeatback modulator, a repeatback transmitter coupled to be modulated by the amplified output of said repeatback modulator, said repeatback transmitter being tuned to a secondary frequency; repeatback receiving means disposed in said control station comprising a monitor receiver tuned to said secondary frequency, a second preamplifier connected to amplify the output of said monitor receiver, a second amplifier connected to amplify the output of said preamplifier, a second channel selector connected to couple the output of said second amplifier into a second predetermined channel, a second indicator relay unit comprising a second plurality of relays connected to be actuated by respective channels of said second selector, and a second indicator operated by said relays to visually display repeatback information; ranging means comprising a range unit and a range scope, circuit means connecting said transmitter control means to initiate a trace on the horizontal sweep of the range scope and to simultaneously pulse a channel in said first modulator, circuit means coupling the output of said last-named channel to said ranging unit to be amplified in said ranging unit, circuit means connecting said first selector to receive the output from said last-named channel, means to transmit said last-named output on said secondary frequency to the monitor receiver, means connecting said second selector to receive said last-named output of said monitor receiver, and circuit means coupling said last-named output through said second selector and said range unit, to said range scope to present thereon an indication of range of the selected station with respect to the control station.

2. A visual display communications system including a control station and a selected station; said control station comprising a transmitter system comprising a transmitter control unit, a first modulator coupled to said control unit, a first transmitter amplifier coupled to said modulator, and a primary frequency transmitter coupled to said first transmitter amplifier; said control station further comprising a receiving system comprising a secondary frequency monitor receiver, a first receiver amplifier means coupled to said monitor receiver, a first selector coupled to said first receiver amplifier means, at least one indicator relay unit including at least one indicator coupled to said first selector; said primary frequency transmitter normally transmitting continuous carrier wave energy; said transmitter control unit intiating commands to cause said modulator to present modulation on said carrier to transmit carrier energy modulated in accordance with said initiated commands; selected station means to receive and display said commands and to repeatback said commands on said secondary frequency; said secondary frequency receiver receiving said repeatback commands; said first amplifier means amplifying said received repeatback; said first selector separating said repeatback commands to present them to said indicator relay unit to visually present repeatback on said indicator; a ranging system comprising said transmitter control unit, said first modulator, a range unit, a range scope unit coupled to said range unit, said secondary frequency receiver, said receiver amplifier means and said first selector, said modulator being coupled to said ranging unit and including a ranging channel; means to initiate ranging signals in said transmitter control unit; means coupling said signals to said range unit to cause said range unit to effect control of the horizontal trace in the range scope, said range signal being transmitted to said selected station on said primary frequency to cause the selected station to effect repeatback signals, said repeatback signals being received in said secondary frequency receiver, amplified in said secondary frequency amplifying means, and directed to the range scope unit by said first selector to give a display of range of the selected station from the control station.

3. The apparatus of claim 2, said ranging system comprising: means to produce both a positive and a negative pulse output, means coupling said positive pulse output to the horizontal sweep circuit of said range scope; means to control the ranging channel of the first modulator to modulate the primary frequency transmitter, the range signal modulated output from said primary frequency transmitter causing the selected station means to repeatback said range signals on said secondary frequency; and means to cause display of said repeatback range signals on said range scope at a point on the horizontal trace corresponding to the distance of the selected station from the control station.

4. The apparatus of claim 2, said ranging system comprising: a variable frequency free-running multi-vibrator producing a square wave output, a resistance-capacitance network of relatively short time constant coupled to said multivibrator to differentiate said multivibrator output to produce a positive and a negative pulse output, means to couple said positive pulse output to the horizontal sweep circuit of said range scope, a squaring amplifier and a D.C. restorer coupled to said multivibrator to place the longer portion of the square-wave output therefrom at electrical ground, means coupling said D.C. restorer to the range channel of said modulator, the long interval during which the square wave is at electrical ground being the interval during which the modulator ranging channel is permitted to oscillate, the short interval of the square wave being at negative potential providing bias to cut-off the modulator ranging channel for a relatively short period, to permit transmission of modulated electromagnetic waves from the transmitter to effect procuring range information from the selected station.

5. A display type communications system comprising a control station and at least one selected station; said control station comprising transmitter control means, a transmitter, means to modulate said transmitter in accordance with commands from said transmitter control means; said selected station comprising means to receive command correlated transmission, channel selector means coupled to said receiver means to distribute said received transmission in accordance with the character and degree of the commands, display means coupled to said channel selector means to effect visual display of said commands, repeatback means coupled to said channel selector means to initiate repeatback of received commands, a repeatback transmitter, means to modulate the output of said repeatback transmitter in accordance with repeatback actuation of the repeatback means; said control station additionally comprising a receiver to receive repeatback commands, channel selector means coupled to said last mentioned receiver to distribute said received repeatback commands in accordance with the character and degree of the repeatback commands, and display means coupled to said last mentioned channel selector to effect visual display of repeatback of commands; ranging means comprising a range scope, a range unit coupled to said transmitter control means to trigger said range scope in response to intiation of ranging signals in the transmitter control means, said control station selector being coupled to said range scope and including a channel feeding repeatback of ranging commands into the range scope to effect visual indication of received repeatback of ranging, the time between sending and receiving of ranging signals determining the spacing of indications on the range scope to thus indicate the range of the selected station with respect to the control station.

References Cited in the file of this patent

UNITED STATES PATENTS

| | | |
|---|---|---|
| 2,475,848 | May | July 12, 1949 |
| 2,597,895 | Novy | May 27, 1952 |
| 2,610,255 | Hertog et al. | Sept. 2, 1952 |
| 2,677,119 | Luck | Apr. 27, 1954 |
| 2,717,986 | Dimmer | Sept. 13, 1955 |